May 26, 1925.
F. S. SPRING
1,539,607
LUBRICATING SYSTEM FOR INTERNAL COMBUSTION ENGINES
Filed Dec. 13, 1921   2 Sheets-Sheet 1
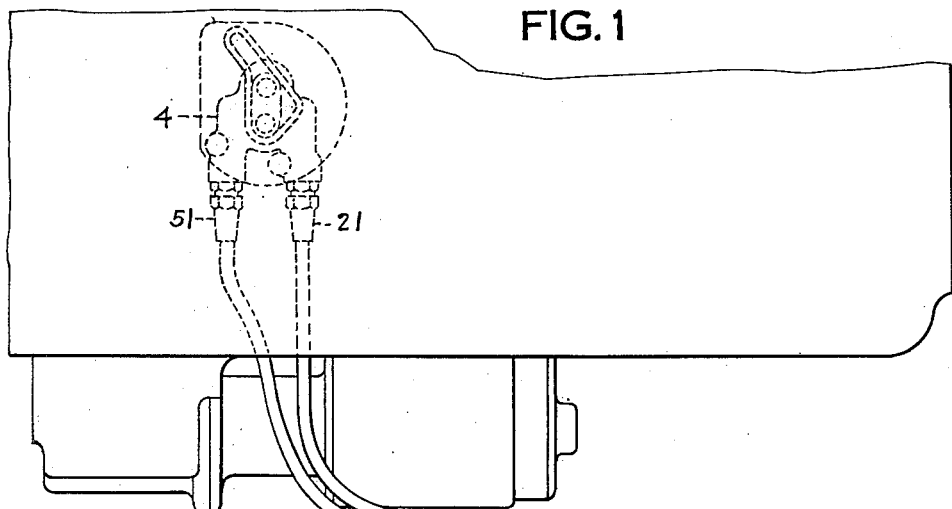
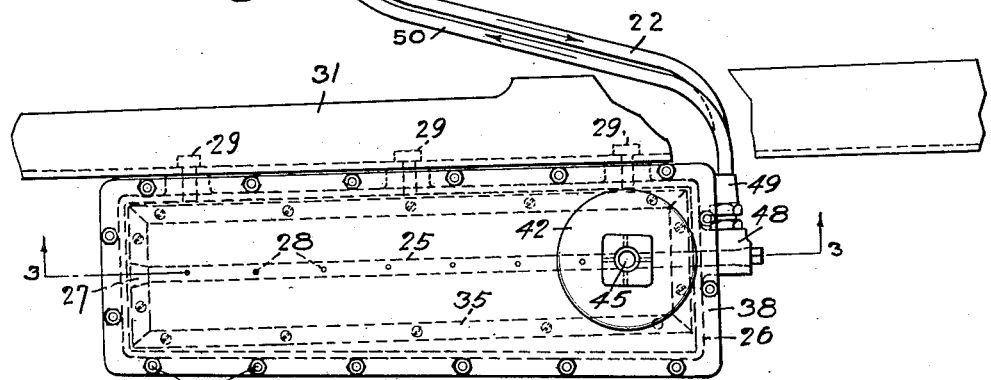
INVENTOR
Frank S. Spring
By Kay, Totten & Brown,
Attorney May 26, 1925.
F. S. SPRING
1,539,607
LUBRICATING SYSTEM FOR INTERNAL COMBUSTION ENGINES
Filed Dec. 13, 1921  2 Sheets-Sheet 2
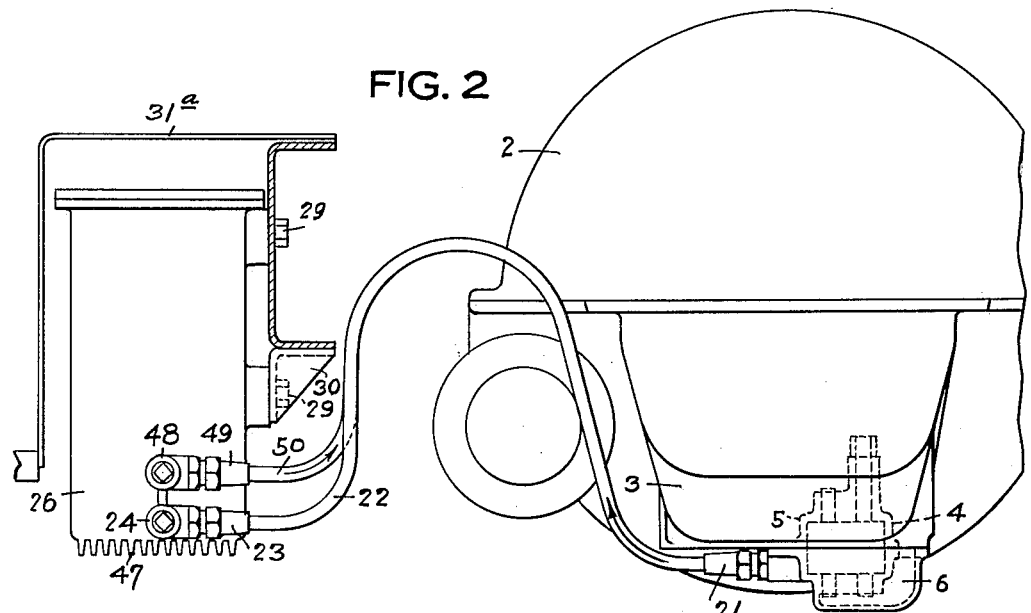
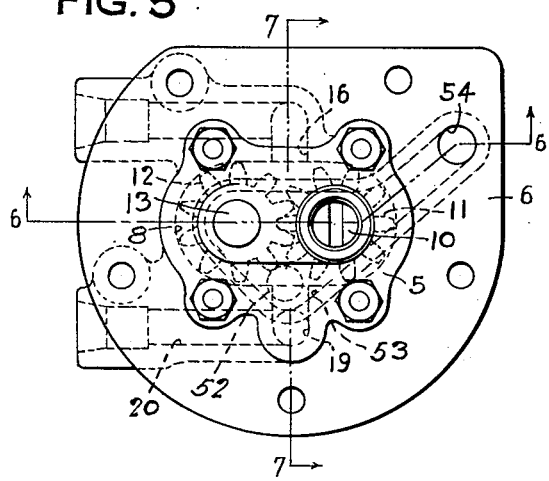
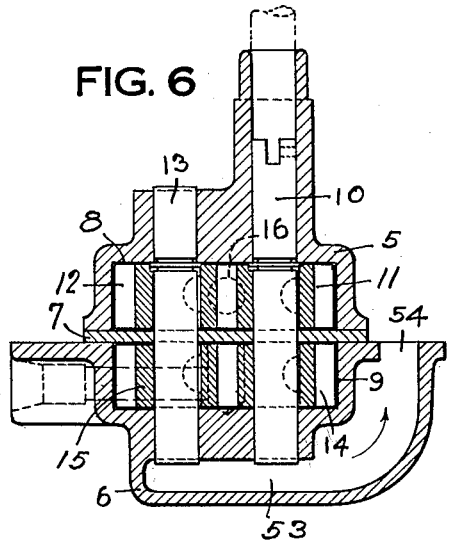
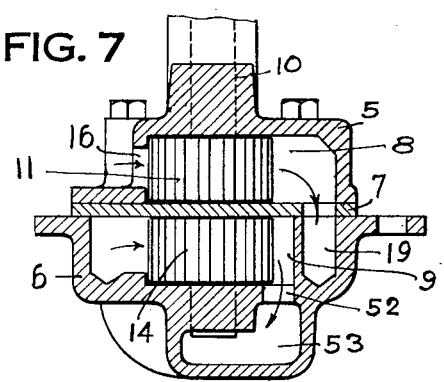
INVENTOR
Frank S. Spring
By Kay, Totten & Brown,
Attorneys Patented May 26, 1925.

1,539,607

UNITED STATES PATENT OFFICE.

FRANK S. SPRING, OF SANDUSKY, OHIO.

LUBRICATING SYSTEM FOR INTERNAL-COMBUSTION ENGINES.

Application filed December 13, 1921. Serial No. 522,035.

*To all whom it may concern:*

Be it known that I, FRANK S. SPRING, a citizen of the United States, and resident of Sandusky, in the county of Erie and State of Ohio, have invented a new and useful Improvement in Lubricating Systems for Internal-Combustion Engines; and I do hereby declare the following to be a full, clear, and exact description thereof.

My invention relates to lubricating systems for internal combustion engines and relates particularly to the lubrication of the engines of motor vehicles, including passenger automobiles, trucks, tractors and motor cycles.

One object of my invention is to provide an improved lubricating system of the forced-feed circulating type, in which the oil is removed from the oil pan or sump of the engine as fast as it is collected, thereby avoiding the splashing of the oil which, in ordinary lubricating systems, causes an excessive mist and over-lubrication of the cylinder blocks, which results in a smoky motor and causes excessive deposits of carbon in the combustion chambers and on the piston heads.

Another object of my invention is to provide a lubricating system which shall furnish a continuous, cool, and clean supply of oil to all parts of the engine.

Another object of my invention is to provide a circulating system of lubrication including an oil-storage tank located some distance from the engine and provided with means for straining the oil, and also with means for cooling the hot oil received from the engine.

A further object of my invention is to provide a lubricating system of the character indicated, having a tank for storing, filtering and cooling the oil, a pump for conveying the oil from the sump of the engine to the tank, and another pump for drawing off the cooled and filtered oil from the tank and returning it to the engine.

The accompanying drawing shows the manner in which I now prefer to construct my improved lubrication system, it being understood, however, that various changes may be made without departing from my invention.

In the drawing, Fig. 1 is a plan view of a portion of an automobile engine equipped with my invention; Fig. 2 is an end elevational view taken from the right of Fig. 1; Fig. 3 is a longitudinal vertical sectional view through the oil tank, the section being taken substantially on the line 3—3, Fig. 1; Fig. 4 is a vertical cross-sectional view of the oil tank, the section being taken substantially on the line 4—4, Fig. 3; Fig. 5 is a plan view of the oil pump; Fig. 6 is a vertical sectional view of the oil pump, the section being taken substantially on the line 6—6, Fig. 5; and Fig. 7 is a vertical sectional view of the oil pump taken at right angles to the section of Fig. 6 and substantially on the line 7—7, Fig. 5.

In the drawing, the numeral 2 designates a portion of the crank case of an automobile engine having the usual oil pan or sump 3, beneath which is attached a pump housing 4 consisting of an upper half 5 and a lower half 6, separated by a divider plate 7 which divides the interior of the pump housing into upper and lower chambers 8 and 9, each of which contains an oil pump of the gear type. Both of these pumps are driven by a vertical shaft 10 connected through suitable gearing to the crank shaft or cam shaft of the engine or to other suitable driving means. The pump contained in the upper chamber 8 draws off the oil accumulated in the oil pan 3 and consists of a gear 11 carried by the shaft 10 and a cooperating gear 12 carried by a vertical shaft 13 which is mounted in bearings formed in the upper and lower halves of the pump housing. The lower pump, contained in the chamber 9 delivers fresh, cool oil to the engine and consists of a gear 14 carried by the shaft 10 and a cooperating gear 15 carried by the shaft 12. The oil from the oil pan 3 enters the upper half of the pump housing through a port 16 and thence passes into the upper pump-chamber 8 which contains the pump gears 11 and 12. From this chamber the oil is forced through a vertical channel 19 and through a horizontal passage 20 and a pipe-connection 21 into one end of a tube 22, the other end of which is attached by a pipe-connection 23 to an inlet 24 communicating with one end of a perforated distributor 25 which rests upon the bottom of an oil storage tank 26. The outer end 27 of the oil distributor pipe 25 is pinched, as shown, or is otherwise closed, and perforations 28 are provided in the distributor pipe in order to spread the oil evenly in the lower compartment of the oil tank 26, The tank 26, as shown in Fig. 2, is located a sufficient distance from the engine for proper cooling, and may be attached by means of bolts 29 and brackets 30 to one of the side-sills 31 of the chassis of the car, where it stands in the cool space between the side-sill 30 and the valance cover 31.

The tank 26 is divided into two compartments by a horizontal strainer which consists of a rectangular metal frame 35 carrying fine wire gauze 36, preferably 80-mesh. The strainer is removably carried by a flange 37 extending around the inside of the tank near its bottom. A cover 38 is secured to the upper flange 39 of the tank 26 by means of bolts 40 and is provided with a filling opening surrounded by an internally threaded flange 41 in which is screwed a filler cap 42 provided with lateral air openings 43 and a vertical air opening 44 for maintaining atmospheric pressure in the tank 20. The vertical opening 44 is closed by a plug 45. A conical strainer 46 of wire gauze is removably suspended from the filler opening, as shown in Fig. 3.

Cooling fins 47 are provided on the bottom of the tank 26 in order to assist in cooling the hot oil which enters the bottom compartment of the tank through the pipe 19.

Oil is drawn from the tank 26 through an outlet 48 which is attached by means of a pipe-connection 49 to a return oil tube 50 which leads back to the oil pump housing and is connected thereto by means of a connection 51. The oil from the tube 50 passes into the lower pump-chamber 9, through the lower gear pump, and thence through a vertical channel 52 and a horizontal channel 53 to an outlet port 54 and back to the engine. The connections by which the oil is distributed from the pump to the engine bearings and other lubrication points form no part of my invention and are therefore not shown on the drawing.

In the operation of the system described above, the upper gear pump draws off, as fast as it collects in the oil pan 3, all of the oil from the various bearings and other points of lubrication, thereby keeping the oil pan substantially dry at all times. This used oil is forced into the oil tank 26 by the upper gear pump, and is distributed evenly therein by the perforated distributor pipe 25. This oil is then compelled, by the pressure produced in the lower chamber of the tank, to pass up through the strainer 36 which effectively removes all carbon particles, sediment and other impurities from the oil. At the same time, the hot oil from the engine is cooled by radiation from the walls 7 of the tank 26, assisted by the fins 47.

From the upper compartment of the oil tank 26, clean and cool oil is drawn by the lower gear pump through the return tube 50, and is delivered through properly-designed passages to all the working parts of the engine.

The oil tank 26 is preferably made of sufficient capacity so that the automobile can run several thousand miles before refilling the tank. For one standard type of automobile this tank contains 4 gallons of oil. When refilling is necessary, the location of the tank at one side of the car makes the filling operation easy, and the strainer 46 removes any foreign matter that may be carried by the oil. When it is necessary to clean the oil tank, the cover 38 and the strainers 36 and 46 may readily be removed and the interior of the tank is then accessible for draining and cleaning.

The system described above is entirely automatic in its operation and has numerous advantages. Since the oil pan is kept practically dry, there is no splashing of oil in the crank case and consequently no over lubrication, smoke or excessive carbon deposits.

It is found that after considerable mileage the oil in the tank still maintains its original greenish color, and the consumption of oil by the engine is greatly decreased because vaporization is prevented by running the oil pan dry and by the method of cooling.

As stated above, the accompanying drawing shows a construction which is preferred for carrying out my invention, but it is to be understood that my invention is not limited to the structural details herein shown, but may be modified within the scope of the appended claims.

I claim as my invention:

1. A lubricating system for internal combustion engines comprising an oil storage tank divided by means of a horzontal strainer into a relatively large upper compartment and a relatively small lower compartment, an oil inlet below said strainer, a perforated oil distributor pipe connected to said inlet and adapted to distribute oil evenly in said lower compartment, an oil outlet above said strainer, and a filler cap removably inserted in an opening in said tank and provided with an air port for maintaining atmospheric pressure within said tank.

2. A lubricating system for internal combustion engines comprising an oil storage tank displaced from the engine and divided by a horizontal strainer into a relatively large upper compartment and a relatively small lower compartment, an oil inlet disposed below said strainer, a perforated oil distributor pipe communicating with said oil inlet and adapted to distribute oil evenly in said lower compartment, an oil outlet above said strainer, means for closing said tank while maintaining atmospheric pressure therein, a pump for drawing off oil from the oil pan of the engine and for forcing said used oil through said strainer, and another pump for drawing off oil through the said oil outlet and for delivering said oil to the lubrication points of the engine.

3. A lubricating system for internal combustion engines comprising an oil tank divided by means of a horizontal screen into a relatively large upper compartment and a relatively small lower compartment, an oil inlet disposed in a side wall of said tank below said strainer, a perforated distributor pipe communicating with said oil inlet and adapted to distribute oil evenly in said lower compartment, an oil outlet disposed in a side wall of said tank above said strainer, a removable cover for said tank, a filler cap removably closing an opening in said tank, cooling fins formed on the outside of said tank, a pump connected to draw off the oil accumulated in the oil pan of the engine and to force said accumulated oil through said distributor pipe and through said strainer, and a second pump connected to draw off oil from said pipe through said outlet and deliver said oil to the lubrication points of the engine.

In testimony whereof, I the said FRANK S. SPRING have hereunto set my hand.

FRANK S. SPRING.

Witnesses:
 JOHN F. WILL,
 EDITH K. FREESE.